United States Patent [19]

Yamada et al.

[11] Patent Number: 5,708,919

[45] Date of Patent: Jan. 13, 1998

[54] IMAGING FORMING APPARATUS FOR FORMING IMAGES ON BOTH SURFACES OF RECORDING MEDIUM

[75] Inventors: Takanobu Yamada; Hidehiko Shibano, both of Toyokawa, Japan

[73] Assignee: Minolta Co., Ltd., Osaka, Japan

[21] Appl. No.: 640,584

[22] Filed: May 1, 1996

[30] Foreign Application Priority Data

May 2, 1995 [JP] Japan ............................ 7-131147

[51] Int. Cl.$^6$ .......................... G03G 15/20; G03G 15/23
[52] U.S. Cl. ................................ 399/67; 399/324; 399/51
[58] Field of Search .................................... 399/324, 325, 399/51, 53, 38, 39, 67

[56] References Cited

U.S. PATENT DOCUMENTS

| | | |
|---|---|---|
| 4,437,122 | 3/1984 | Walsh et al. |
| 4,783,840 | 11/1988 | Song |
| 4,876,606 | 10/1989 | Banno et al. |
| 4,920,428 | 4/1990 | Lin et al. |
| 5,040,023 | 8/1991 | Yokoyama |
| 5,051,833 | 9/1991 | Tsuji |
| 5,132,739 | 7/1992 | Mauer et al. |
| 5,223,935 | 6/1993 | Tsuji et al. |
| 5,353,107 | 10/1994 | Sculley et al. |
| 5,424,819 | 6/1995 | Menjo |

FOREIGN PATENT DOCUMENTS 5-40424  2/1993  Japan

Primary Examiner—R. L. Moses
Attorney, Agent, or Firm—McDermott, Will & Emery

[57] ABSTRACT

An image forming apparatus for forming images on both surfaces of a recording sheet. It is discriminated from image signals obtained by scanning a first surface and a second surface of an original which surface has more or less toner consumption, and the image formation sequence is controlled so that an image, which has been judged to have less toner consumption, is first formed on the first surface of the recording medium while an image, which has been judged to have more toner consumption, is formed on the second surface of the recording sheet afterward. Also, in the formation process of the image, which has been judged to have less toner consumption, the fixing roller is not coated with anti-offset liquid, but in the formation process of the image, which has been judged to have more toner consumption, it is controlled so that the fixing roller is coated with the anti-offset liquid.

9 Claims, 12 Drawing Sheets

IMAGING FORMING APPARATUS FOR FORMING IMAGES ON BOTH SURFACES OF RECORDING MEDIUM

BACKGROUND OF THE INVENTION

1. Field of the Invention

The present invention relates to an image forming apparatus of a type which transfers a toner image formed on a photosensitive member onto a recording medium such as recording sheet, and more particularly to an image forming apparatus adapted to avoid any influence of anti-offset liquid in a fixing device therefor.

2. Description of the Prior Art

In a conventional image forming apparatus of an electrophotographic system, in order to prevent a phenomenon (referred to as offset), in which toner sticks to a heat fixing roller of the fixing device, anti-offset liquid (hereinafter, referred to as mold release agent) such as silicone oil has been coated, but in the case of a monochromic image, the amount of the toner transferred onto the recording medium is small, and therefore, the amount of coating thereof has been set to an exceedingly small amount.

For this reason, the mold release agent transferred onto the recording medium during a fixing process passes through toner particles in a comparatively short time, and diffuses and penetrates through the fiber of the recording medium. The mold release agent transferred onto a portion of the recording medium having no toner also diffuses and penetrates through the fiber of the recording medium likewise. Therefore, the adhesion of the mold release agent onto the recording medium hardly affects the sheet penetrating performance and the recorded image even in a both-face copy, etc., thus posing no problem.

When, however, a full-color image is formed by a subtractive color mixing method, in which three or four colors of toners are laid one on top of another, like a full-color copying machine, far more toners are transferred onto the recording medium than when a monochromic image is formed with a black toner like a conventional monochrome copying machine. For this reason, the fixing device in the full-color copying machine has the following problems, and is greatly different from the monochrome copying machine in the material of the fixing roller and the structure of mold release agent coating unit.

① Since three or four colors of toners are laid one on top of another, a large quantity of toners should be fixed.

② In order to develop the toner in the lower layer, it is necessary to sufficiently melt the toner in the upper layer, but the application of an amount of heat enough to melt it easily causes the offset.

③ When an OHP film or the like is used as a recording medium, it is necessary to sufficiently heat because the translucency will deteriorate unless the surface layer of the toner is finished smoothly, but the application of a sufficient amount of heat easily causes the offset as in the aforesaid ②.

④ If a full-color image is lustered like a silver halide photograph, it is desirable in respects of impression of its appearance, brightness, and color reproducibility, but to this end, it becomes necessary to make the surface of the fixing roller smooth, and to reduce the viscosity of the toner resin.

In an ordinary monochrome copying machine, a roller having high mold release characteristics as a fixing roller, for example, a roller coated with tetrafluoroethylene resin is used, but since such a roller has the difficulty in the smoothness on the surface, a silicone rubber roller excellent in the smoothness on the surface and coated with a large amount of mold release agent has been used in the full-color copying machine.

To explain reasons why the fixing roller is coated with a large amount of mold release agent for use, as described in the aforesaid ① to ④, it is necessary to melt-fix a large amount of toners, it easily causes the offset owing to the low viscosity of the toner, the silicone rubber roller is inferior in the mold release of the toner to the roller coated with tetrafluoroethylene resin, and the like.

When a fixing roller is coated with a large amount of mold release agent for the fixing process, in the case of a color image, since the toner adheres to the entire surface area of the recording medium or a considerably large area thereof, the mold release agent adhered to the recording medium is difficult to penetrate, and may be discharged from the fixing device with the mold release agent separated and kept adhered on the surface of the copied image. Also, even in a portion where the copied image is not formed, the recording medium may be discharged with the mold release agent not completely penetrated but kept adhered on the surface of the recording medium, or with the mold release agent penetrated up to the back surface thereof and kept adhered on the back surface.

In case of both-face copying, in which an image is copied on the two sides of the recording medium, the recording medium discharged from the fixing device is re-circulated in the apparatus to form the image again on the surface of the recording medium, on which an image has not been formed. When, however, the re-circulation is performed with the mold release agent kept adhered on the surface of the recording medium, or with the mold release agent kept adhered on the back surface thereof as described above, the mold release agent adhered on the surface or the back surface of the recording medium may adhere to convey rollers, a transfer drum, a photosensitive member, and the like in the conveying paths, and cause trouble such as conveying deviation, delay in conveying, and jamming due to slip of the recording medium.

In addition, the adhesion of the mold release agent on the photosensitive member changes the sensitivity of the photosensitive member to deteriorate the image quality, and the adhesion of the mold release agent on the photosensitive member, the transfer drum or the like makes it impossible to sufficiently clean the remaining toner, thus making the recording medium dirty. Therefore, maintenance operation such as replacing or cleaning the photosensitive member and the transfer drum will be required.

Further, there is the problem with the fixing device for the full-color copying machine that the recording medium is curled because a large amount of toner are melt-fixed to the recording medium. When a large amount of toner are melt-fixed, the recording medium is curled because of a difference in the degree of shrinkage between the recording medium and the toner in the cooling process, and the more the toner is, the larger is the recording medium curled. Originals to be copied by the full-color copying machine are mostly colored over the entire surface thereof, and therefore, recording mediums are greatly curled because the toner adheres to their entire surface.

In case of both-face copying, when a large amount of toner are melted by copying on a first surface of the recording medium to noticeably curl it, there is the possibility of occurrence of the following trouble in conveying paths for re-circulation for copying on a second surface of the recording medium: the recording medium is caught in a guide plate to cause jamming; it is obliquely conveyed in the conveying paths so that it ceases to maintain its stable transport; it becomes difficult to be wound around the transfer drum; or the degree of adhesion to the transfer drum deteriorates to cause defective transfer.

SUMMARY OF THE INVENTION

It is a main object of the present invention to eliminate various difficulties which occur when toner consumption is great even in an image such as a color copy which consumes a large amount of toner, and to provide an image forming apparatus capable of forming an image smoothly.

It is another object of the present invention to provide an image forming apparatus capable of smoothly processing image formation by predicting, when images are formed on both surfaces of a recording medium, an amount of toner to be consumed in accordance with the quality of an image to be recorded, and by giving priority to the formation of an image with less toner consumption.

It is a further object of the present invention to provide an image forming apparatus capable of smoothly processing image formation by predicting, when images are formed on both surfaces of a recording medium, an amount of toner to be consumed in accordance with the quality of an image to be recorded, and by restricting the supply of anti-offset liquid supplied to a fixing device in the formation of an image with less toner consumption.

An even further object of the present invention will be apparent from the detailed description with reference to the accompanying drawings.

DETAILED DESCRIPTION OF THE PREFERRED EMBODIMENTS

Figure 1:
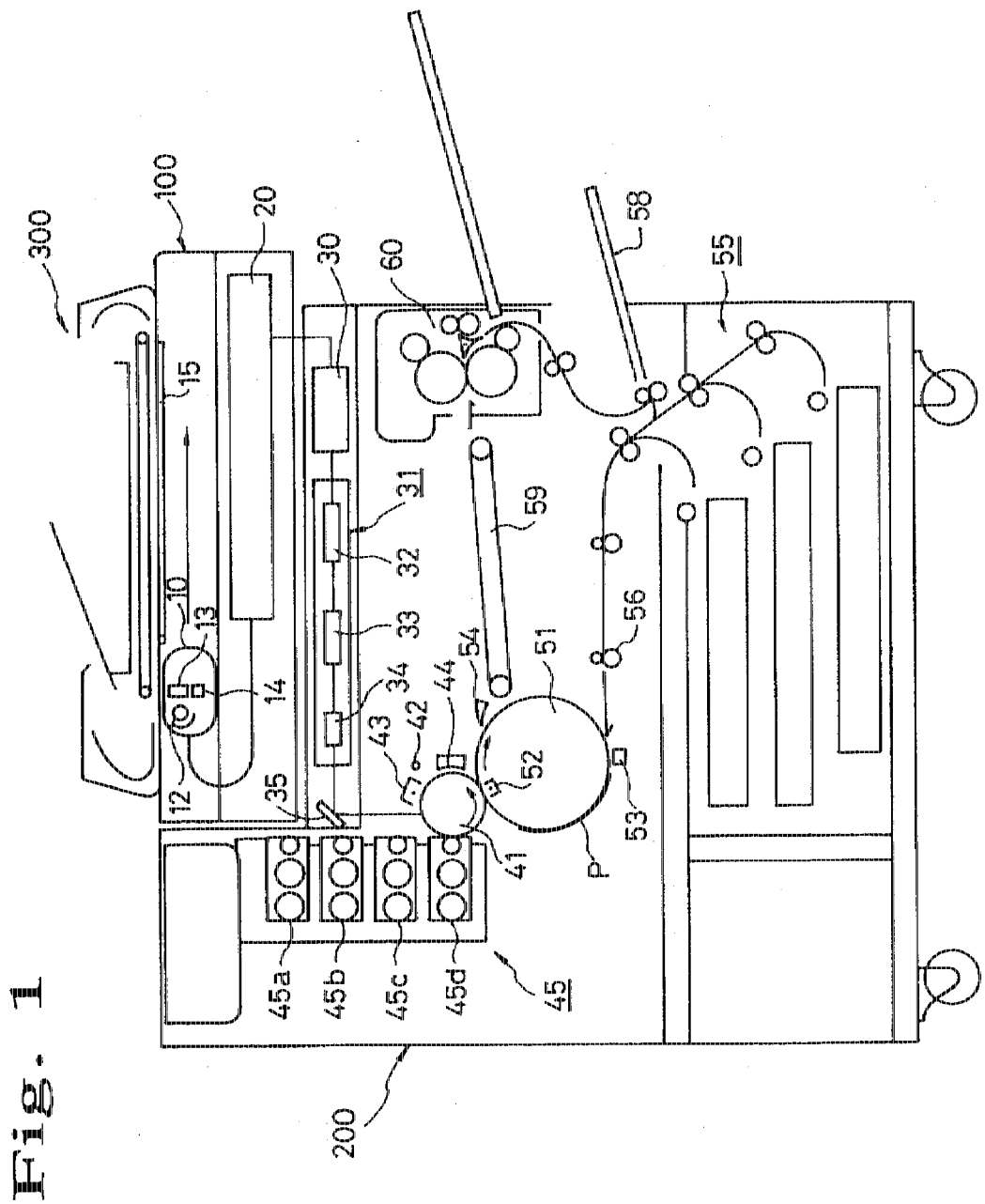
FIG. 1 is a sectional view showing the schematic structure of a digital color copying machine to which the present invention is applied.

Hereinafter, the description will be made of embodiments according to the present invention. FIG. 1 is a sectional view showing the structure of a digital color copying machine to which the present invention is applied. In FIG. 1, reference numeral 100 designates an image reader for reading the image on an original to convert it into an image signal; 200, an image forming unit for reproducing the image on the basis of the image signal read by the image reader 100 to record it on a recording sheet. The image forming unit 200 is composed of a print head unit 31, a developer unit 45, a sheet feed unit 55, a fixing device 60, a photosensitive drum 41, a transfer drum 51 and the like. In addition, there is arranged, on a platen 15, a known automatic original feeding device 300, which feeds originals onto the platen 15 one sheet for each time, collects an original, for which scanning has been finished, and turns over the collected original for feeding it again.

A scanner 10 in the image reader 100 is provided with a lamp 12 for illuminating an original, a rod lens array 13 for condensing light reflected by the original, and a close contact CCD color image sensor 14 for converting the condensed light into electrical signals. The scanner 10 is driven by a motor (not shown) to scan an original on the platen 15.

Trichromatic multi-valued electrical signals of red (R), green (G), and blue (B), which have been output from the image sensor 14, and color-separated, are converted into a 8-bit, 256-tone image signals of yellow (Y), magenta (M), cyan (C) and black (Bk) after A/D conversion is effected in a signal processing unit 20, and are subjected to predetermined corrections such as shading correction to store digital image signals of each color thus obtained in an image memory 30.

The print head unit 31 in the image forming unit 200 is composed of a laser beam output unit 32 for modulating a laser beam for output, a polygon mirror 33, f/θ lens 34, a reflective mirror 35 and the like. The print head unit 31 digital-to-analog converts digital image signals for each color of yellow, magenta, cyan and black output from the image memory 30 in order, and then inputs them into the laser beam output unit 32. Then, the laser beam modulated by the image signal is projected onto a photosensitive drum 41 through the polygon mirror 33, the f/θ lens 34 and the reflective mirror 35 to form a latent image.

The developing unit 45 is composed of developers 45a, 45b, 45c and 45d, in which toners of yellow, magenta, cyan and black have been filled respectively, and the developers, in which toners of the respective predetermined colors are filled, are selected correspondingly to the latent images of yellow, magenta, cyan and black formed on the photosensitive drum 51 to develop the latent images for visualizing.

On the periphery of the photosensitive drum 41, there are arranged an eraser lamp 42, a main charger 43, a cleaner 44 and the like.

On the periphery of the transfer drum 51, there are arranged a transfer charger 52, a clamping mechanism 53 for attaching a recording medium P on the transfer drum 51, a separating claw 54, and the like. The surface of the transfer drum 51 is covered with a recording medium carrier sheet formed of a dielectric film, and a recording medium P is electrostatically attracted and held.

The transfer drum 51 rotates in synchronism with the photosensitive drum 41. A recording medium P fed from the sheet feed unit 55 is fed to the transfer drum 51 after the sheet feed timing is adjusted by a timing roller 56, and is electrostatically attracted and held onto a recording medium carrier sheet on the transfer drum 51 by means of the clamping mechanism 53.

Toner images of cyan, magenta, yellow and black formed in order on the photosensitive drum 41 are registered in order and are transferred in superposition onto a recording medium P. On the completion of all the transfer process, the recording medium P is peeled off from the transfer drum 21 by means of a separating claw 54, is conveyed by a conveying belt 59, and is fixed by a fixing device 60 for discharging.

In case of both-face recording, a recording medium P whose first surface has been recorded is once fed to a reverse rotation tray 58, where its conveying direction is reversed, and then is re-fed for image forming on the second surface thereof. This structure is known, and therefore, its detailed description is omitted.

Figure 2:
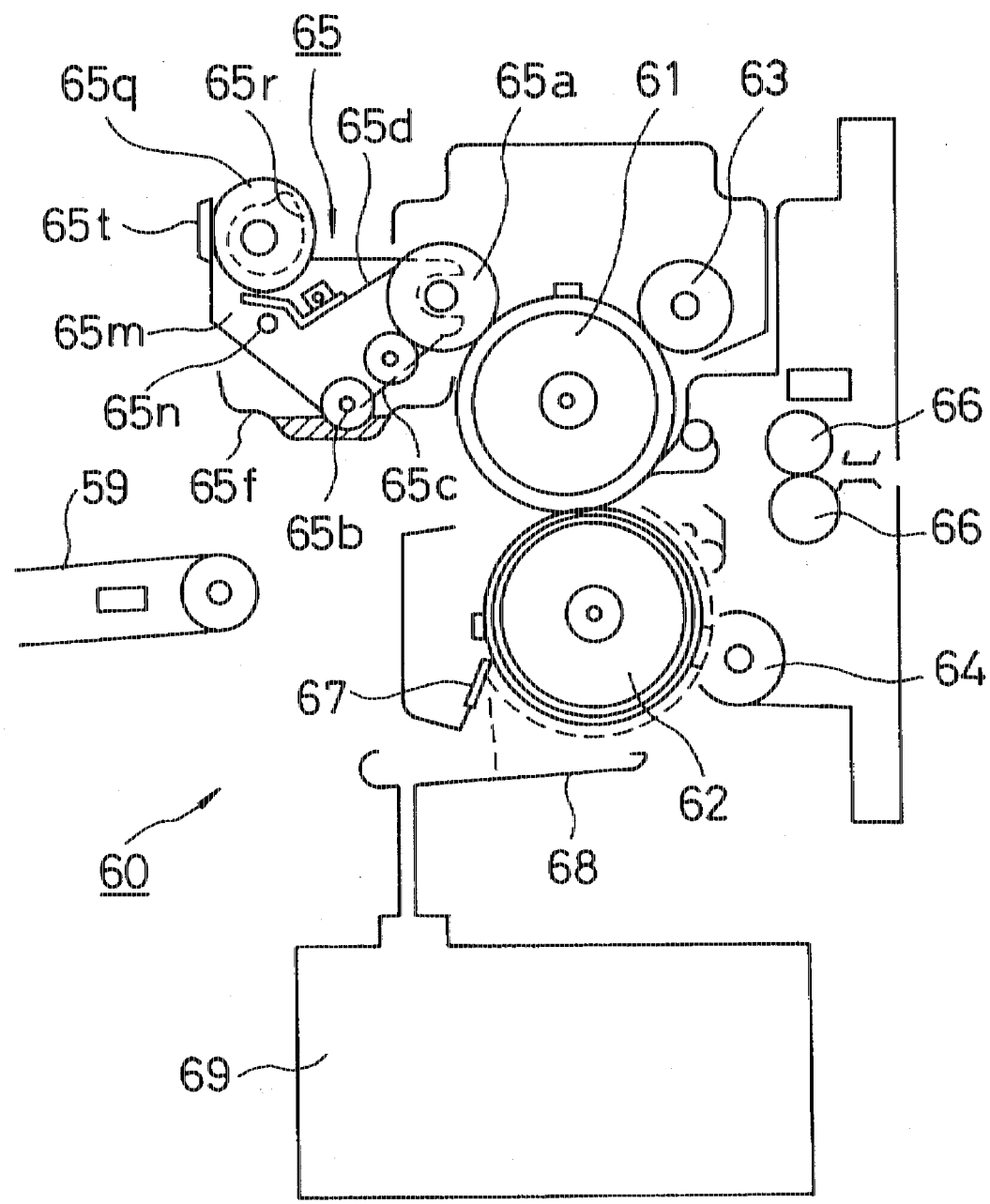
FIG. 2 is a sectional view showing the structure of a fixing device.

Next, the fixing device 60 will be described in detail. FIG. 2 is a sectional view showing the structure of the fixing device, in which reference numerals 61 and 62 designate an upper fixing roller and a lower fixing roller respectively. Each of these fixing rollers has a heater inside, and is controlled by a temperature control device to maintain a predetermined surface temperature. Reference numerals 63 and 64 designate cleaning rollers for cleaning the surfaces of the upper fixing roller 61 and the lower fixing roller 62 respectively.

Reference numeral 65 designates a mold release agent coating unit for coating the upper fixing roller 61 with a mold release agent such as silicone oil, and its detail will be described with reference to FIG. 3 later. Reference numeral 66 designates a sheet exhaust roller for discharging a recording medium P fixed a transferred image thereon, by the upper fixing roller 61 and the lower fixing roller 62. A mold release agent collection blade 67 comes into contact with the lower fixing roller 62 to collect the mold release agent adhered to the surface of the lower fixing roller 62. The structure is arranged so that the mold release agent thus collected is collected in a collection tank 69 through a catch pan 68.

The structure of the mold release agent coating unit 65 is described with reference to FIGS. 3 and 4. In the mold release agent coating unit 65, a coating roller 65a, liquid feed rollers 65b and 65c are assembled above a frame 65m which rocks around a shaft 65n, and a mold release agent regulating blade 65d is rockably assembled around a shaft 65e above the frame 65m. The frame 65m is biased by a biasing spring (not shown) to rotate clockwise around the shaft 65n.

Also, the mold release agent coating unit 65 is provided with cams 65q and 65r which are rotationally driven around the shaft 65p by a driving mechanism (not shown), and an action plate 65t provided at one end of the frame 65m abuts on the cam 65q while a holding plate 65u for the mold release agent regulating blade 65d abuts on the cam 65r. Below the mold release agent coating unit 65, a mold release agent pan 65f is arranged, and the structure is arranged so that the mold release agent filled in the mold release agent pan 65f is fed to the coating roller 65a through liquid feed rollers 65b and 65c.

Figure 3:
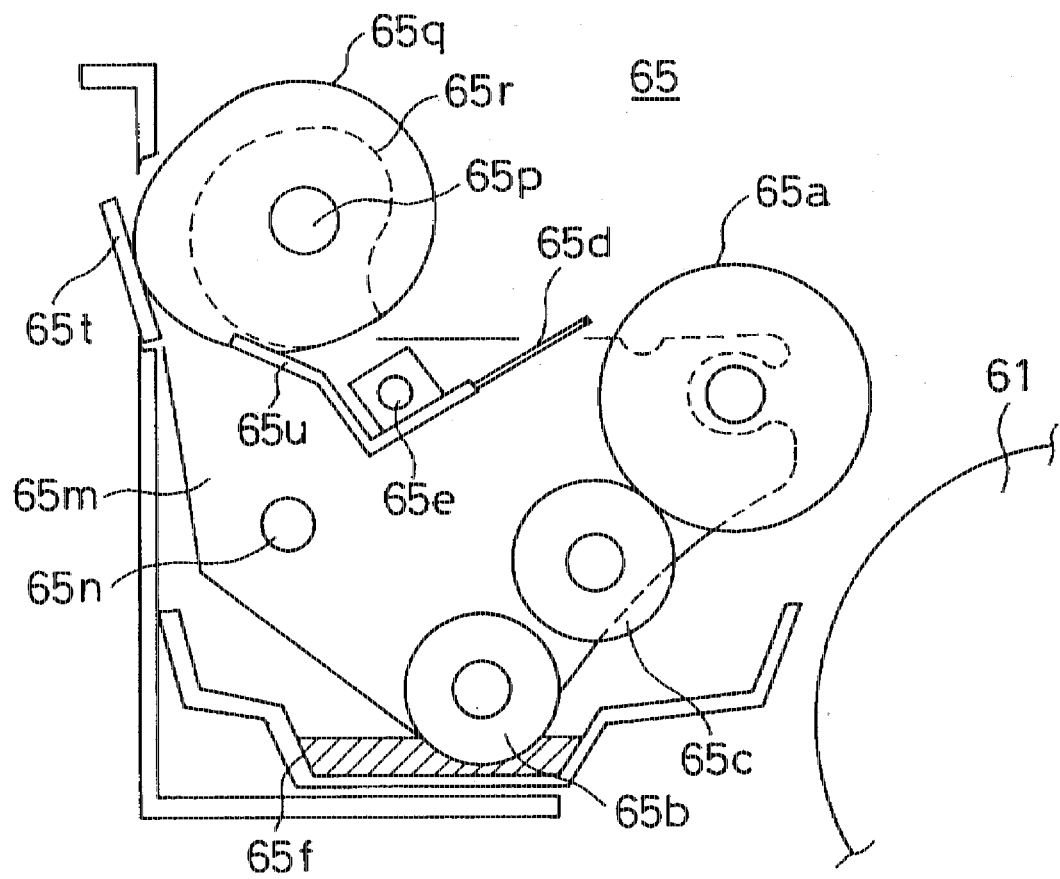
FIG. 3 is a sectional view showing the structure of a mold release agent coating unit in the fixing device when coating roller is separated from the upper fixing roller.
Figure 4:
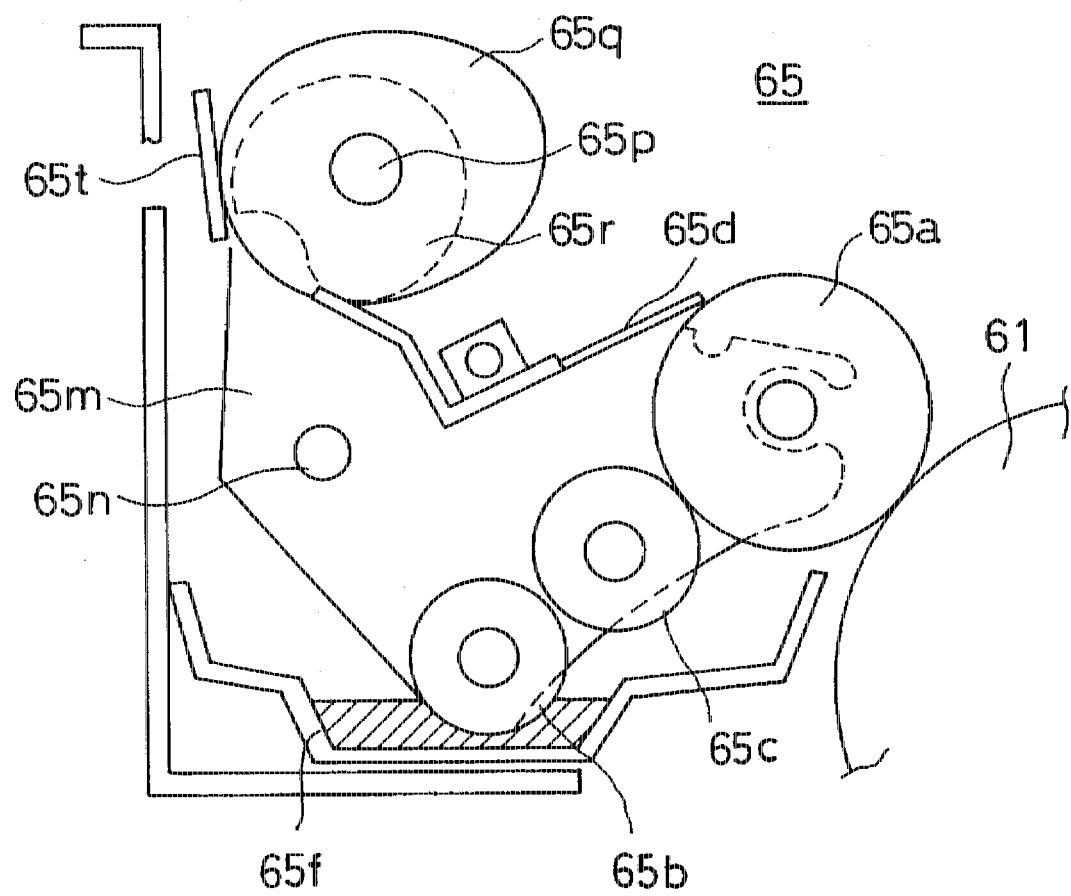
FIG. 4 is a sectional view showing the structure of the mold release agent coating unit in the fixing device when coating roller is abutted on the upper fixing roller.

When the action plate 65t provided at one end of the frame 65m is pressed in the left direction by means of the cam 65q, the frame 65m rotates counterclockwise around the shaft 65n against the biasing spring, and the coating roller 65a is separated from the upper fixing roller 61, while the mold release agent regulating blade 65d is also in a retracted position apart from the coating roller 65a as shown in FIG. 3. In this retracted position, no mold release agent is fed to the upper fixing roller 61.

On coating the upper fixing roller 61 with a mold release agent, the driving mechanism (not shown) is operated to rotate the cams 65q and 65r, and the frame 65m is rotated clockwise around the shaft 65n by the biasing spring. Then, the coating roller 65a abuts upon the upper fixing roller 61 under pressure, and the mold release regulating blade 65d also comes into contact with the coating roller 65a. FIG. 4 shows this state, and at this operating position, the coating roller 65a and the liquid feed rollers 65b and 65c are rotated by the driving mechanism (not shown) to feed the mold release agent in the mold release agent pan 65f to the coating roller 65a through the liquid feed rollers 65b and 65c. At this time, the mold release agent fed to the coating roller 65a is regulated to a predetermined amount by the mold release agent regulating blade 65d to scrape any excess mold release agent off. The amount of coating can be also controlled by regulating the number of revolutions of the coating roller 65a.

Figure 5:
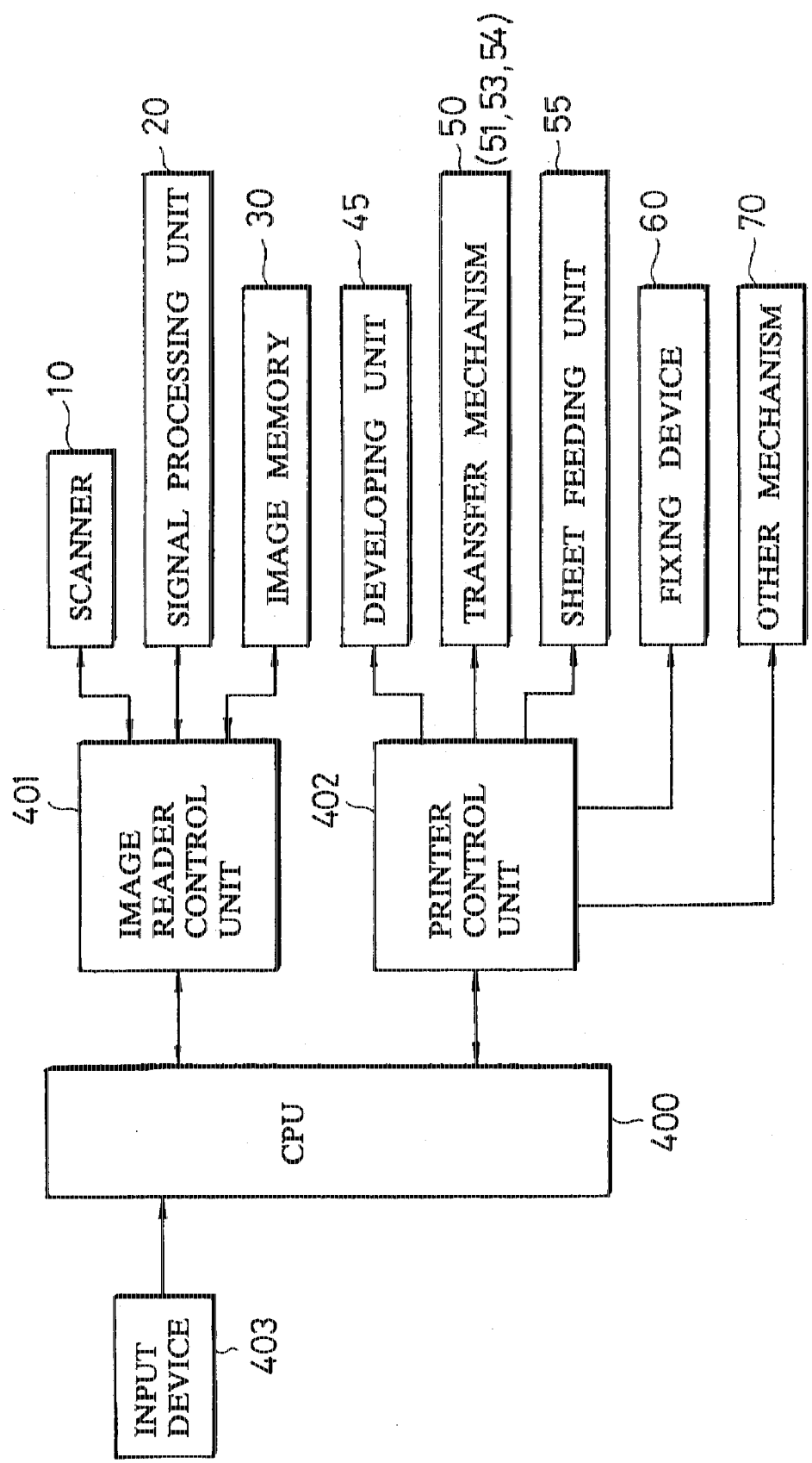
FIG. 5 is a block diagram showing the structure of a control circuit.

FIG. 5 is a block diagram showing the structure of the control circuit for a digital color copying machine to which the present invention is applied. The control circuit is formed of a CPU 400, and there are connected to an input/output port of the CPU 400 an input device 403 such as a keyboard on an operating panel, an image reader control unit 401, a printer control unit 402, and the like. The aforesaid scanner 10, signal processing unit 20, image memory 30 and the like are connected through the image reader control unit 401, and the aforesaid transfer mechanism 50 such as the developer unit 45, the transfer drum 51, the clamping mechanism 53 and the separating claw 54, the fixing device 60 including the sheet feed unit 55, and the mold release agent coating unit 65, and the other mechanisms 70 are controlled through the printer control unit 402.

Figure 6:
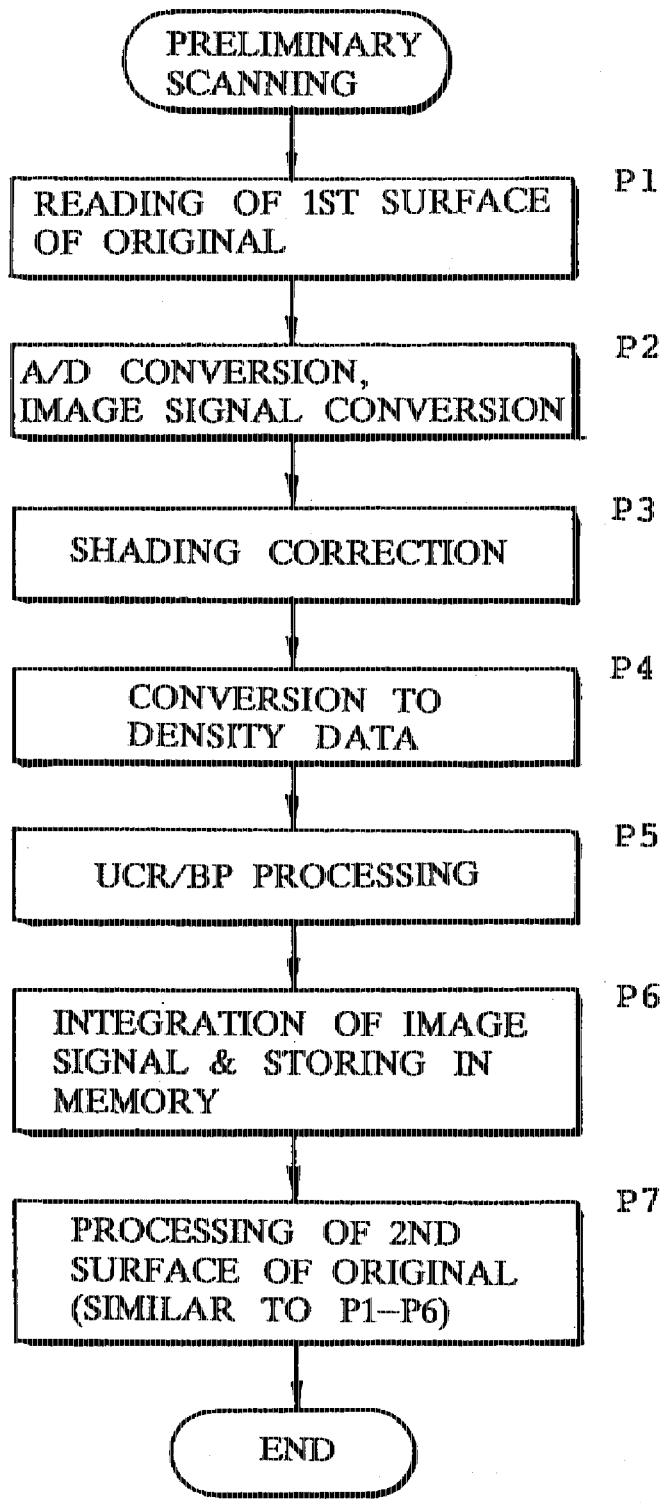
FIG. 6 is a flowchart illustrating the preliminary scanning in a first embodiment.
Figure 7:
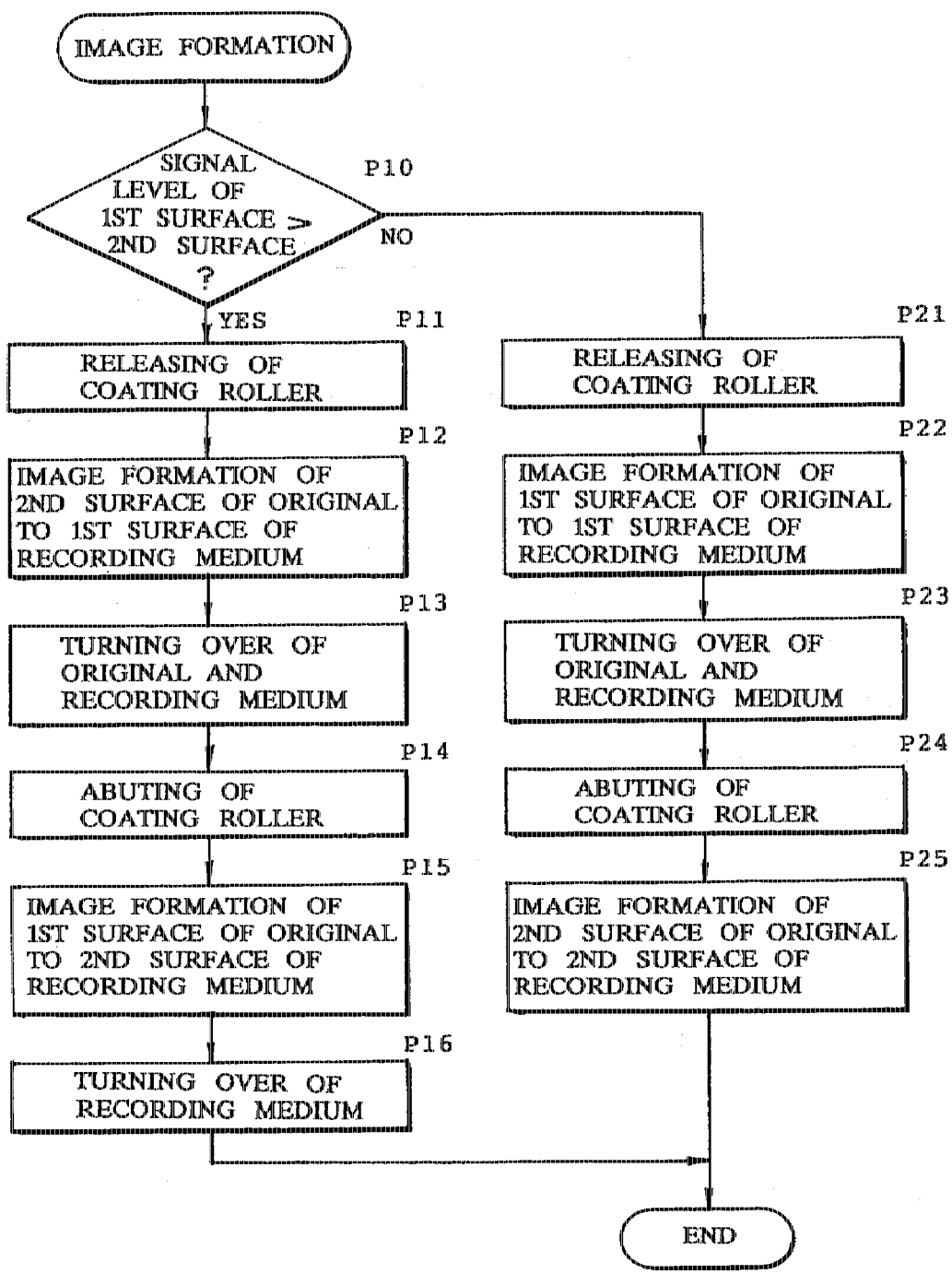
FIG. 7 is a flowchart illustrating the image forming process in the first embodiment.

FIGS. 6 and 7 are flowcharts for illustrating the control operation for image formation in the case of both-face recording executed by the CPU 400. FIG. 6 is a flowchart showing preliminary scanning for predicting toner coverage for an image formed on a recording medium P. FIG. 7 is a flowchart for illustrating a process in which, as the result of the preliminary scanning, whether an image should first be formed on the first surface of an original or on the second surface thereof is determined on the basis of the toner coverage thus predicted, for image formation.

First, the preliminary scanning will be described with reference to the flowchart of FIG. 6. The automatic original feeding device feeds an original with the first surface (the front) thereof facing the scan surface on the platen to read the first surface of the original by a CCD color image sensor 14 (Step P1). Multi-valued image signals of red (R), green (G) and blue (B) color-separated into three primary colors are analog-to-digital converted into 8-bit 256-tone digital image signals of yellow (Y), magenta (M), cyan (C) and black (Bk) (Step P2).

Shading correction for correcting the sensitivity due to the light volume unevenness of each element and lamp of CCD, and the reflectance unevenness, etc. of the mirror is performed (Step P3), and the reflection data R obtained is converted into density data D by means of an operation expression of D=-log R (Step P4).

In order to perform an UCR/BP process for preparing data for forming a black toner image (Step P5), and also to predict the toner coverage on the recording medium, the output levels of digital image signals for each pixel of each color of yellow (Y), magenta (M), cyan (C) and black (Bk) are integrated, and the integrated values are stored in a signal level integrated value memory (Step P6). Since the output level of the digital image signal represents the image density, the integrated value for the output levels represents the predicted value for the toner coverage.

The automatic original feeding device reversely rotates the original to perform the processes similar to the aforesaid Steps P1 to P6 for the second surface (the back) of the original (Step P7). Since the integrated value of output level of digital image signal, which is an index representing the toner coverage, has been obtained for each of the first and second surfaces of the original so far, the preliminary scanning is completed.

Next, the description will be made of a process, with reference to the flowchart of FIG. 7, in which whether an image of the first surface of an original or of the second surface thereof should be formed first is determined in accordance with the predicted value for the toner coverage, for image formation.

The integrated value of signal level for the image on the first surface (the front) of the original stored in the signal level integrated value memory is compared with that for the image on the second surface (the back) thereof (Step P10). As the result of comparative judgment based on the Step P10, in case where the toner coverage for the image on the first surface of the original is judged to be more, the formation of the image on the second surface of the original, which has less toner coverage and less curled recording medium, is first performed, and will be followed by the formation of the image on the first surface thereof.

That is, the pressurized contact between the coating roller 65a and the upper fixing roller 61 in the mold release agent coating unit 65 of the fixing device is released (Step P11), and the second surface of the original is fed on the platen by the automatic original feeding device, and is scanned to form its image on the first surface of a recording medium P (Step P12). The original and the recording medium are turned over (Step P13), the coating roller 65a is allowed to abut upon the upper fixing roller 61 in the mold release agent coating unit 65 (Step P14). The first surface of the original is scanned to form its image on the second surface of the recording medium (Step P15), and the recording medium is turned over so that the first and second surfaces of the original correspond to the second and first surfaces of the recording medium respectively (Step P16) to complete the image forming process.

Also, as the result of the comparative judgment based on the Step P10, in case where the toner coverage for the second surface has been judged to be more, the image on the first surface, which has less toner coverage, is first formed, and thereafter the image corresponding to the second surface of the original will be formed.

That is, the pressurized contact between the coating roller 65a and the upper fixing roller 61 in the mold release agent coating unit 65 of the fixing device is released (Step P21), the first surface of the original is fed on the platen by the automatic original feeding device, and is scanned to form its image on the first surface of the recording medium (Step P22). The original and the recording medium are turned over (Step P23), and the coating roller 65a is allowed to abut upon the upper fixing roller 61 in the mold release agent coating unit 65 (Step P24). The second surface of the original is scanned to form its image on the second surface of the recording medium (Step P25). In this case, no turning-over process is performed because the first and second surfaces of the original correspond to the first and second surfaces of the recording medium respectively.

In the above-described image forming process, the pressurized contact between the coating roller 65a for coating the mold release agent and the upper fixing roller 61 is released (Step P11, Step P21) in the first image formation. This is because an image corresponding to the surface of the original, on which the toner coverage is predicted to be small, is formed in the first image formation, and offset is less likely to occur and therefore, the mold release agent which has been impregnated into the upper fixing roller 61 is sufficient, and it is not necessary to further coat any mold release agent. In addition, since a large amount of mold release agent do not adhere to the recording medium in this case, there is no possibility either that the mold release agent adheres to the photosensitive member or the re-fed sheet conveying paths during re-feeding of the recording medium to cause trouble.

In the second image formation, the coating roller 65a and the upper fixing roller 61 are abutted upon each other under pressure (Step P14, Step P24). This is because the image corresponding to the surface of the original, on which the toner coverage is predicted to be great, is formed in the second image formation, and therefore, offset is likely to occur. In the second image formation, since the recording medium is not re-fed, but is exhausted outward, the mold release agent does not adhere to the photosensitive member or the re-fed sheet conveying paths even if the mold release agent adheres to the recording medium, thus it is not likely to cause trouble.

Even in the above-described image forming process based on the Steps P12, P15 and Steps P22, P25, as in the case of the aforesaid preliminary scanning, multi-valued image signals of red (R), green (G), and blue (B), which have been read from the original scanned by the CCD color image sensor 14, and color-separated into three primary colors, are analog-to-digital converted into 8-bit, 256-tone digital image signals of yellow (Y), magenta (M), cyan (C) and black (Bk), and are subjected to shading correction to convert the reflection data obtained into density data D. Then, a UCR/BP process for preparing data to form black toner image is performed to obtain image signals of yellow (Y), magenta (M), and cyan (C) and black (B) for image formation.

In the first embodiment described above, since the original has been set at a predetermined position on the platen by the automatic original feeding device for scanning even in the preliminary scanning, it takes a lot of time to complete the image formation. As measure against this, there is proposed a "flow reading method" in which the original is read by the image sensor placed in a predetermined position on the platen in the course of conveying the original by the automatic original feeding device in the preliminary scanning.

In this respect, when the original is flow-read by the image sensor, since the original is conveyed by a conveying belt, unevenness may occur in the conveying speed, thus resulting in unevenness in an image signal to be output. In the preliminary scanning, however, it will suffice if it can be predicted from the integrated value of output level of the image signal obtained which is greater in the toner coverage, on the first surface or on the second surface of the original, and therefore, there is no trouble even if the flow reading is used.

Figure 8:
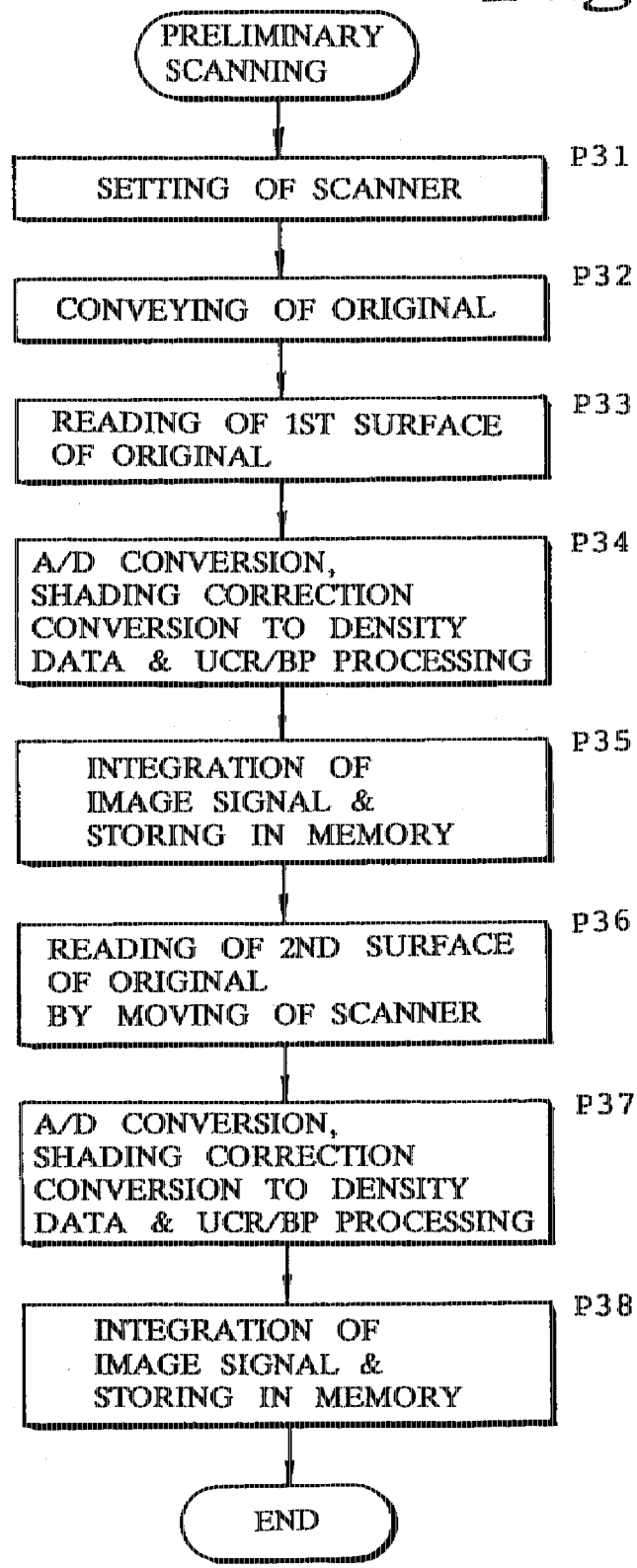
FIG. 8 is a flowchart illustrating the preliminary scanning in a second embodiment.

Hereinafter, the description will be made of the second embodiment in conjunction with the flowchart shown in FIG. 8, in which the first surface of the original is flow-read, and the original, for which flow-reading has been completed, is turned over to set the second surface to a predetermined position for regular preliminary scanning. This corresponds to the preliminary scanning described in the flowchart shown in FIG. 6.

First, the scanner is fixedly set on an upstream side of the scan starting position of the platen (Step P31), the conveying of the original is started by the automatic original feeding device (Step P32), and the first surface of the original is flow-read by the CCD color image sensor (Step P33). Multi-valued image signals of red (R), green (G) and blue (B) color-separated into three primary colors are analog-to-digital converted, and are converted into multi-tone digital image signals of yellow (Y), magenta (M), cyan (C) and black (Bk), which are subjected to shading correction, density conversion and UCR/BP process (Step P34) to obtain digital image signals for each pixel of each color of yellow (Y), magenta (M), cyan (C) and black (Bk). Then, the output levels are integrated, and the values thus integrated are stored in the signal level integrated value memory (Step P35). The image signal process in the Step P34 is the same as in the first embodiment.

The original is subsequently conveyed without being stopped, and is turned over at the reverse rotation unit in the automatic original feeding device, the second surface of the original is set to a predetermined position, is scanned by moving the scanner to read the second surface thereof (Step P36). As in the foregoing, multi-valued image signals of each color of RGB color-separated into three primary colors are analog-to-digital converted, are converted into image data, and are subjected to shading correction, density conversion, and UCR/BP process (Step P37) to obtain digital image signals for each pixel of each color of yellow (Y), magenta (M), cyan (C) and black (Bk). The output levels are integrated, and the integrated values are stored in the signal level integrated value memory (Step P38) to complete the preliminary scanning.

There is a process, in which, on the basis of the toner coverage predicted from the integrated value of the output level of the image signals, it is determined, on which surface the image formation should be first executed, the first surface of the original or the second surface thereof, and the image is formed. This process is the same as the process in Steps P10 to P25 described in the first embodiment previously.

In the second embodiment described above, the original is set in place, and is scanned by moving the scanner in the preliminary scanning of the second surface of the original, which has been turned over, but instead, the scanner may be fixed and set on a downstream side of the scan-completing position of the platen on scanning the second surface of the original for flow-reading. In this case, the preliminary scanning time can be further shortened than in the above-described second embodiment.

In the first and second embodiments described above, the toner coverage is estimated from the integrated value of image signals obtained by preliminarily scanning both the first and second surfaces of the original to determine on which surface the image formation should be first executed, the first surface of the original or the second surface thereof. In the practical use, however, the toner coverage is to such a degree that curled recording medium due to adhesion of toner can be ignored, and offset is not likely to occur. Therefore, the image on the first surface of the original may be first formed even if the image on the first surface of the original has more toner coverage than that on the second surface thereof.

Therefore, it is judged whether or not the toner coverage estimated from the integrated value of image signal on the first surface of the original is less than a predetermined value at which curled recording medium does not pose any problem, and if less than the predetermined value, the preliminary scanning of the second surface of the original is omitted, and the image formation may be started immediately.

Further, in the first and second embodiments described above, all the image signal values for each pixel obtained from the preliminary scanning of the original are integrated to estimate the toner coverage from the value, but in order to estimate the toner coverage, it is not necessary to integrate all the image signal values for each pixel, but samples may be extracted every several scanning lines or every several pixels to integrate the sample image signal values. According to this sampling method, it becomes possible to shorten the preliminary scanning time and the operation time, and save the memory capacity.

Also, in the first and second embodiments described above, in order to estimate the toner coverage, the preliminary scanning of the original is performed, and thereafter, the regular scanning for forming an image is performed. If, however, a memory having a capacity corresponding to images for two surfaces of originals as an image memory is provided, it will become possible to omit the preliminary scanning, to estimate the toner coverage, to determine which should be first processed, the first surface or the second surface of the original in accordance with the image signals obtained by the regular scanning on the first and second surfaces of the original at a time for each, and to continuously execute the image formation, thus making it possible to perform the image formation effectively within a short time.

In the first and second embodiments described above, the amount of toner consumed for the image formation is estimated on the basis of the image signal obtained by scanning the original. However, generally a color image is formed by superposing toners of four colors of yellow, cyan, magenta and black, and the entire surface of the original is mostly colored, and therefore, the toner consumption becomes greater than in the formation of a monochromic image.

Therefore, in the case of a mixture of a color original and a monochromic original, the problem of the invention can be accomplished even by distinguishing the color original from the monochromic original to execute the image formation of the latter ahead.

Hereinafter, the description will be made of a third embodiment using this method. In this embodiment, it is assumed that the image memory has a capacity corresponding to two surfaces of originals, and that the structure is arranged so that the number of revolutions of the coating roller is controlled to control the amount of the mold release agent to be coated on the fixing roller.

Figure 9:
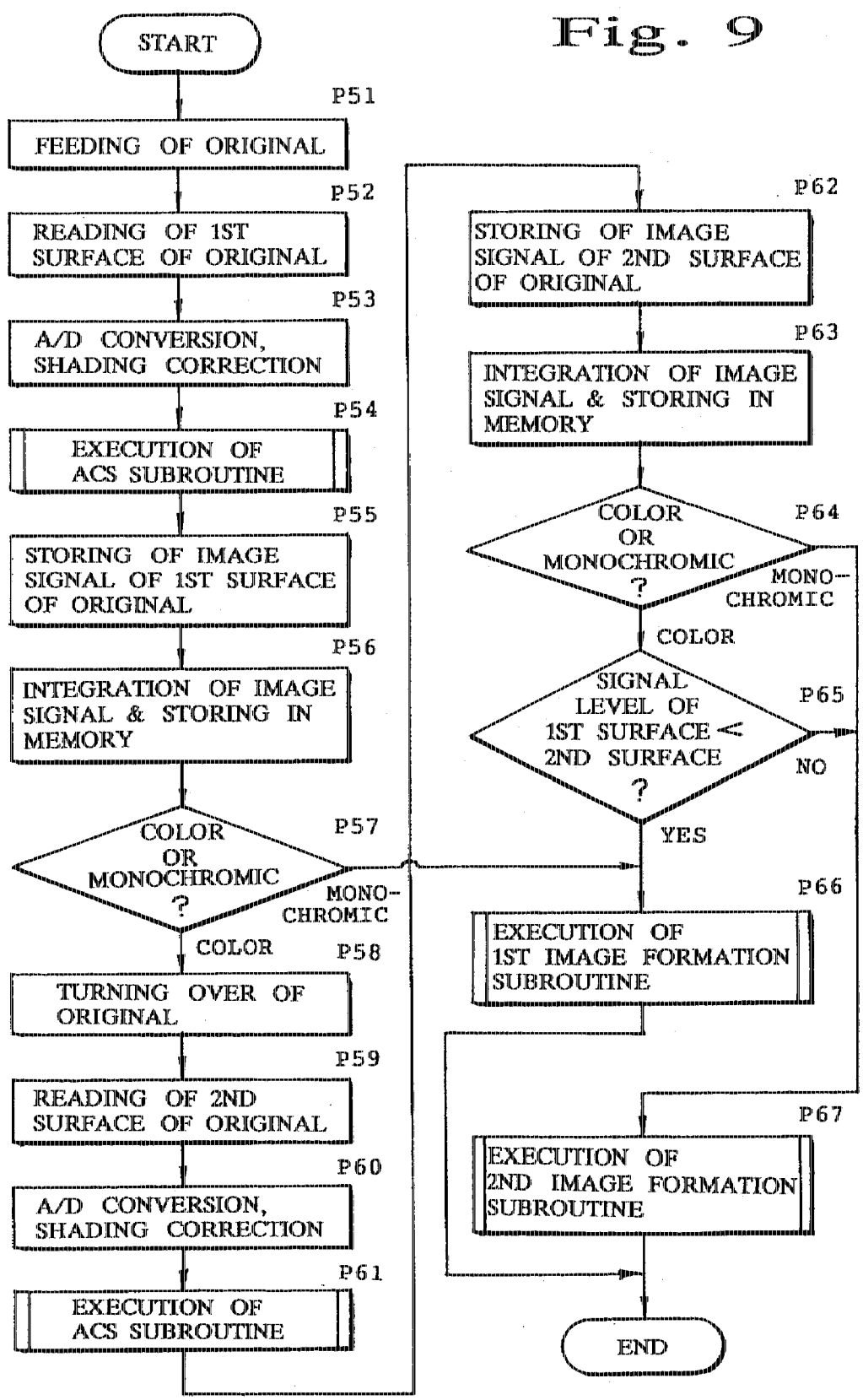
FIG. 9 is a flowchart illustrating the image forming process in a third embodiment.

FIG. 9 is a flowchart for illustrating the image forming process in the third embodiment. First, originals (which are assumed to be a mixture of color originals and monochromic originals) are set to the automatic original feeding device, and one of them is fed onto the platen (Step P51) to read the first surface of the original by the CCD color image sensor. Image signals of red (R), green (G) and blue (B) color-separated into three primary colors are obtained (Step P52), further are analog-to-digital converted, and are subjected to predetermined corrections such as shading correction (Step P53).

An ACS process subroutine is executed by an automatic color original identification device (ACS) (Step P54), and each of image signals of red (R), green (G) and blue (B) in the pixels, which has been further read, is converted into digital image signals of yellow (Y), magenta (M), cyan (C) and black (Bk). These image signals are subjected to predetermined corrections and are stored in an image memory as the image signals on the first surface of the original (Step P55).

Also, the output levels of image signals of yellow (Y), magenta (M), cyan (C) and black (Bk) on the first surface of the original are integrated to store the integrated values into the signal level integrated value memory (Step P56).

Whether the first surface of the original is a color original or a monochromic original is discriminated by referring to the determination result of the ACS process subroutine (Step P57). When the first surface of the original is a color original, the original is turned over by the automatic original device (Step P58), and is fed onto the platen to read the second surface of the original by the CCD color image sensor. Thus, the image signals of red (R), green (G) and blue (B) color-separated into three primary colors are obtained (Step P59), are further analog-to-digital converted, and are subjected to predetermined corrections such as shading correction (Step P60).

The ACS process subroutine using the automatic color original identification device (ACS) is executed (Step P61), image signals of red (R), green (G) and blue (B) in the pixels, which have been further read, are converted into digital image signals of yellow (Y), magenta (M), cyan (C) and black (Bk), are subjected to predetermined corrections such as shading correction, and are stored into the image memory as the image signal on the second surface of the original (Step P62). The image signals on the first and second surfaces of the original are stored in the image memory.

Also, the output levels of digital image signals of yellow (Y), magenta (M), cyan (C) and black (Bk) are integrated to store the integrated values into the signal level integrated value memory (Step P63).

Whether the second surface of the original is a color original or a monochromic original is discriminated by referring to the determination result of the ACS process subroutine (Step P64), and when the second surface of the original is a monochromic original, the operation shifts to Step P67 to first perform the formation of a monochromic image based on the image signal on the second surface of the original, and then to perform the formation of a color image based on the image signal on the first surface thereof afterward.

When the second surface of the original is found to be a color original by the discrimination in Step P64, that is, when color images are to be formed on both surfaces of the recording medium, it is discriminated by comparison which is greater, the signal level integrated value of the first surface of the original stored in the signal level integrated value memory, or that of the second surface thereof (Step P65). As the result of the discrimination, when the signal level integrated value of the first surface of the original is smaller, the first image formation subroutine is executed (Step P66) to first perform the image formation based on the image signal on the first surface of the original, and then the image formation based on the image signal on the second surface thereof afterward.

When the signal level integrated value of the first surface of the original is greater by the discrimination in Step P65, the second image formation subroutine is executed (Step P67) to first perform the image formation based on the image signal on the second surface of the original, and then the image formation based on the image signal on the first surface thereof afterward. In this case, in order to allow the order of the first and second surfaces of the original to coincide with that of the first and second surfaces of the recording medium, it is necessary to turn over the recording medium on which the image formation has been completed, but this process is incorporated into the second image formation subroutine.

Also, when the first surface of the original is of an achromatic color (monochrome) by the discrimination in the Step P57, it is not necessary to discriminate whether or not the second surface thereof is a color original again, and therefore, the first image formation subroutine is executed (Step P66). The image formation based on the image signal on the first surface of the original is first performed, and then the image formation based on the image signal on the second surface thereof is performed afterward.

Figure 10:
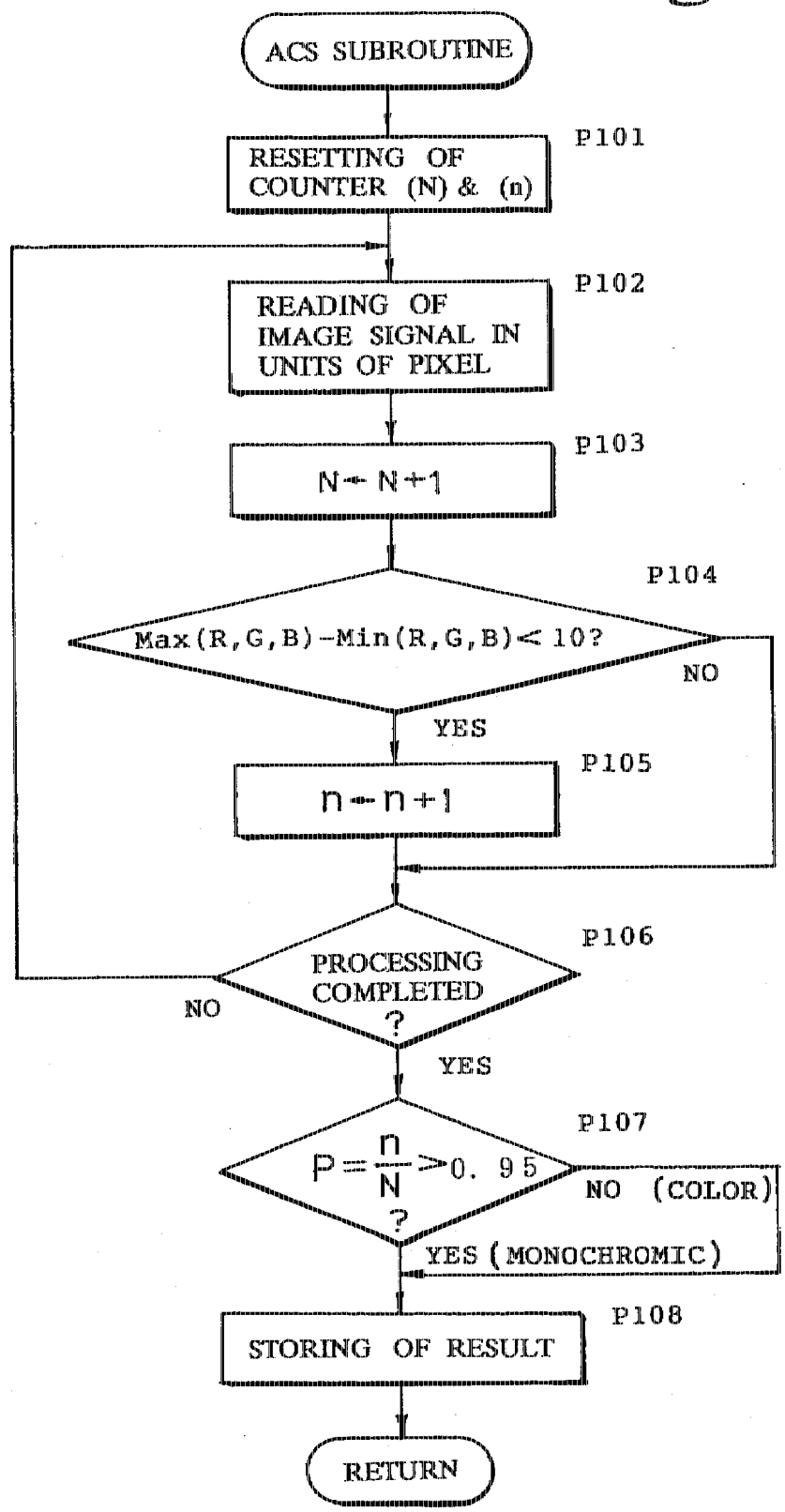
FIG. 10 is a flowchart illustrating a ACS processing subroutine in the third embodiment.

In the flowchart of FIG. 9, the detail of the ACS process subroutine shown as Steps P54 and P61 will be described with reference to the flowchart shown in FIG. 10. Taking notice of the fact that when the difference between the maximum value and the minimum value of image signals of red (R), green (G) and blue (B) in the pixels of the image signal is zero, the image is of an achromatic color (monochrome), the ACS process subroutine discriminates whether or not the original is of an achromatic color (monochrome) from the ratio of the pixels, in which the difference between the maximum value and the minimum value is less than the predetermined value, to the total pixel number in consideration of the error in the signal processing.

First, a counter (N) and a counter (n) are reset(Step P101), the image signals are successively read out from the image memory in units of pixel (Step P102), and the number of pixels N, which have been read out, is counted by the counter (N)(Step P103). Next, it is discriminated whether or not the difference between the maximum value and the minimum value of pixel signals of red (R), green (G) and blue (B), which have been read out, is smaller than the predetermined value (10 in this embodiment)(Step P104). When smaller, the number n, which has been discriminated to be smaller, is counted by the counter (n) (Step P105).

The completion of the process on the image signal on the entire surface of the original is discriminated (Step P106), and when the process is not yet completed, the operation returns to the Step P102 for continuing the aforesaid process. In case that the process completed, the ratio p=n/N of the number n, which has been discriminated to be smaller, to the total number N is determined. In case where the ratio p>0.95, the original is discriminated to be of an achromatic color (monochromic), and otherwise of a chromatic color (Step P107). The discrimination result is stored in the memory (Step P108).

Figure 11:
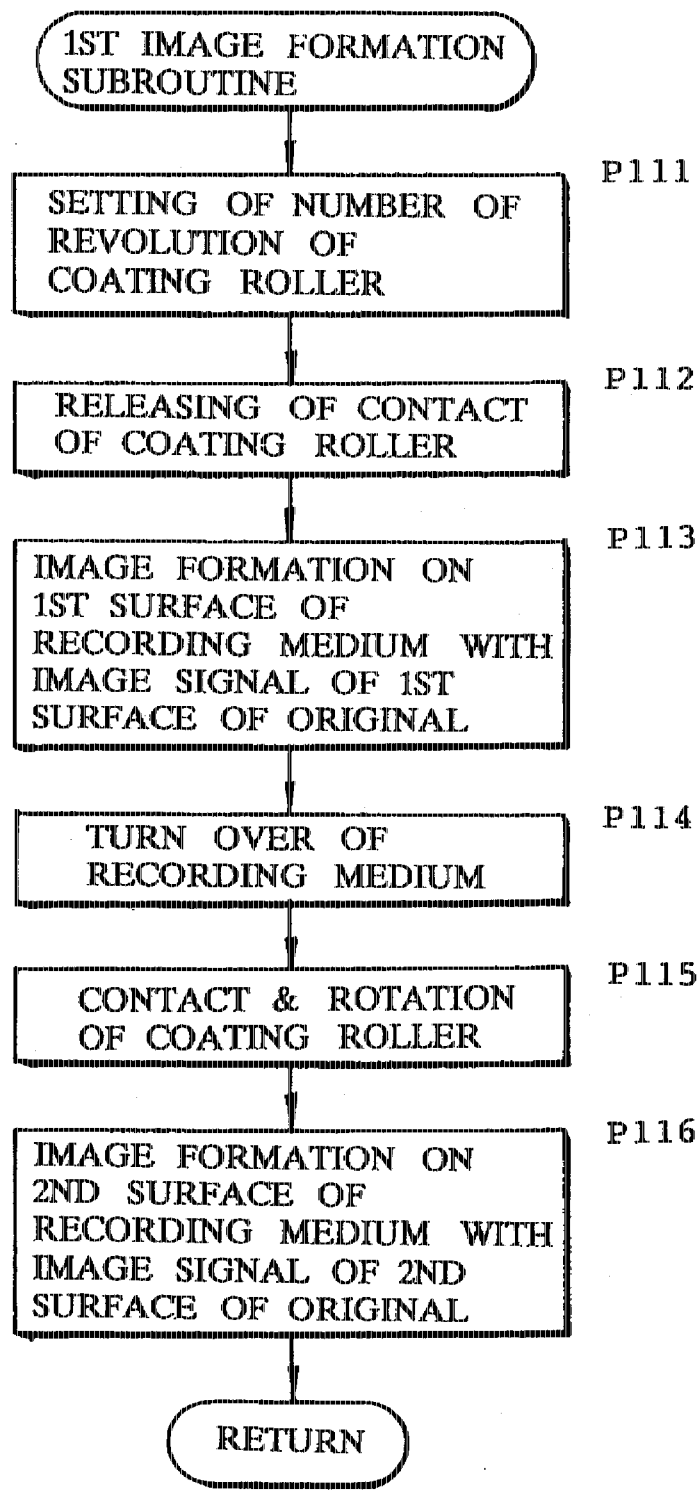
FIG. 11 is a flowchart illustrating a first image forming subroutine in the third embodiment.
Figure 12:
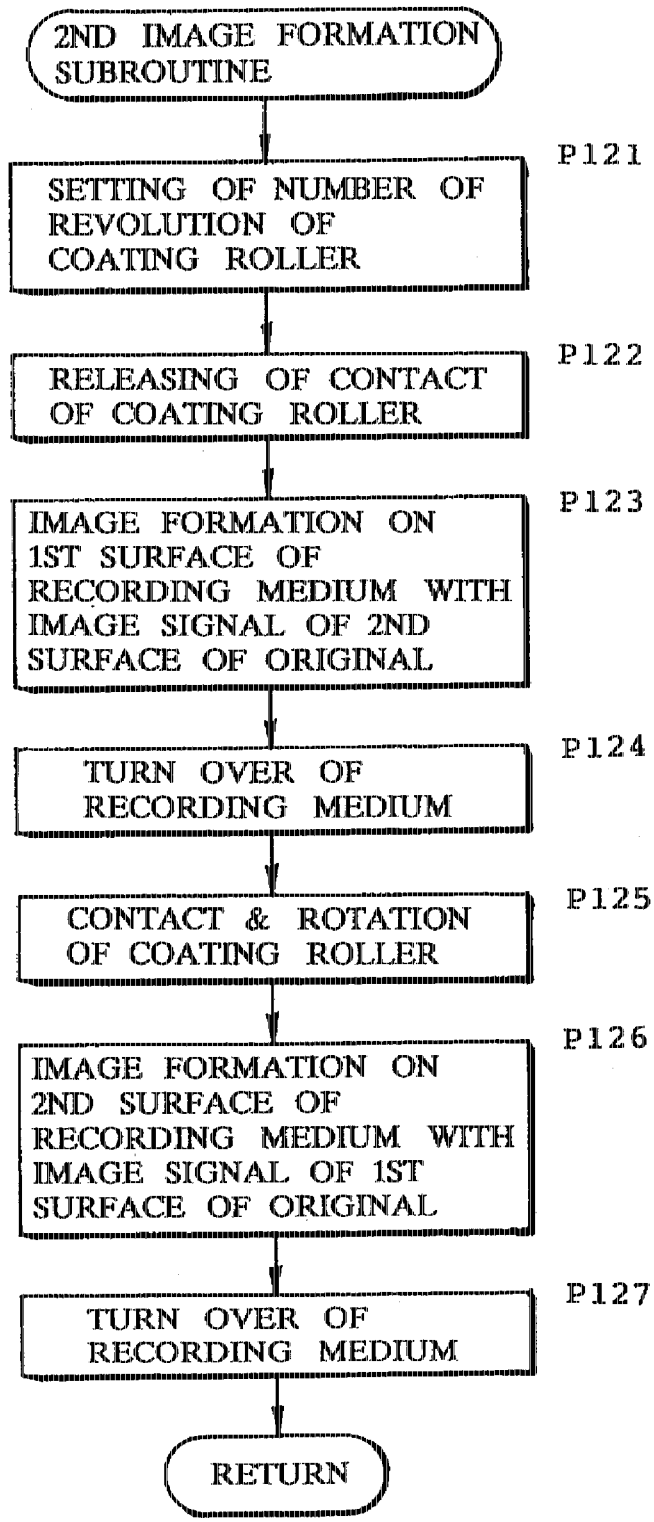
FIG. 12 is a flowchart illustrating a second image forming subroutine in the third embodiment.

In the flowchart of FIG. 9, the detail of the first image formation subroutine shown as Step P66 will be described in conjunction with the flowchart shown in FIG. 11. The first image formation subroutine first executes the image formation based on the image signal on the first surface of the original, and then the image formation based on the image signal on the second surface of the original afterward.

First, the number of revolutions of the coating roller for coating the fixing roller with the mold release agent is set to a predetermined value (Step P111). In this respect, by determining the number of revolutions of the coating roller in accordance with the estimated value for toner coverage in advance, the amount of mold release agent to be coated can be controlled to an optimal amount.

Then, by rotating counterclockwise the frame 65m of the mold release agent coating unit 65 in the fixing device, the pressurized contact between the coating roller 65a and the upper fixing roller 61 is released (Step P112), and the image signal on the first surface of the original is read out from the image memory to form the image on the first surface of the recording medium based on the image signal on the first surface of the original (Step P113).

The recording medium is turned over (Step P114), and the frame 65m of the mold release agent coating unit 65 in the fixing device is rotated clockwise to thereby allow the coating roller 65a and the upper fixing roller 61 to place in close contact with each other. Then the coating roller is rotated only a predetermined number of times to coat the fixing roller with the mold release agent (Step P115). The image signal on the second surface of the original is read out from the image memory to form the image on the second surface of the recording medium based on the image signal on the second surface of the original (Step P116).

Since the first and second surfaces of the original correspond to the first and second surfaces of the recording medium respectively, the recording medium is not turned over.

In the flowchart of FIG. 9, the detail of the second image formation subroutine shown as Step P67 will be described in conjunction with the flowchart shown in FIG. 13. The second image formation subroutine first executes the image formation based on the image signal on the second surface of the original, and then the image formation based on the image signal on the first surface of the original afterward.

First, the number of revolutions of the coating roller for coating the fixing roller with the mold release agent is set to a predetermined value (Step P121).

Then, by rotating counterclockwise the frame 65m of the mold release agent coating unit 65 in the fixing device, the pressurized contact between the coating roller 65a and the upper fixing roller 61 is released (Step P122), and the image signal on the second surface of the original is read out from the image memory to form the image on the first surface of the recording medium based on the image signal on the second surface of the original (Step P123).

The recording medium is turned over (Step P124), and the frame 65m of the mold release agent coating unit 65 in the fixing device is rotated clockwise to thereby allow the coating roller 65a and the upper fixing roller 61 to place in close contact with each other. Then the coating roller is rotated only a predetermined number of times to coat the fixing roller with the mold release agent (Step P125). The image signal on the first surface of the original is read out from the image memory to form the image on the second surface of the recording medium based on the image signal on the first surface of the original (Step P126).

Since the first and second surfaces of the original do not correspond to the first and second surfaces of the recording medium respectively, the recording medium is turned over (Step P127).

Even in the above-described subroutine, the pressurized contact between the coating roller 65a for coating the mold release agent and the upper fixing roller 61 is released in the first image formation. This is because an image corresponding to the surface of the original, on which the toner coverage is predicted to be small, is formed in the first image formation, and offset is less likely to occur and therefore, the mold release agent which has been impregnated into the upper fixing roller 61 is sufficient, and it is not necessary to coat any mold release agent. In addition, since a large amount of mold release agent do not adhere to the recording medium in this case, there is no possibility either that the mold release agent adheres to the photosensitive member or the re-fed sheet conveying paths during re-feeding of the recording medium to cause trouble.

In the second image formation, the coating roller 65a and the upper fixing roller 61 are abutted upon each other, and the coating roller is rotated only a predetermined number of revolutions to hereby coat the fixing roller with the mold release agent. This is because the image corresponding to the surface of the original, on which the toner coverage is predicted to be great, is formed in the second image formation, and therefore, offset is likely to occur. In the second image formation, since the amount of the mold release agent to be coated is controlled to an optimal amount, it does not cause any trouble by the adhesion of a large amount of the mold release agent to the recording medium, nor is the mold release agent wastefully consumed.

In the foregoing, the description has been made of the embodiments in which the present invention is applied to a digital color copying machine, but the present invention is not only applicable to the color copying machine, but also to an image forming apparatus having great toner coverage such as a copying machine having a function to form an image by turning over the negative/positive of an original.

In the embodiment, the toner coverage is estimated on the basis of the digital image signal from the image, but there are some cases where no trouble is caused in the practical use even if the toner coverage is not so much accurately estimated. In this case, a plurality of sensors are arranged under the platen to detect the light reflected by the original, and the approximate value for the toner coverage can be estimated from the output. This can be applied to even an analog image forming apparatus, but in this case, it is necessary to perform preliminary scanning for estimating the toner coverage, and thereafter in the regular scanning to control so that the original is scanned in a sequence to be determined from the estimated value for toner coverage.

Further, in a copying machine, in which a sensor for detecting the original size has been arranged under the platen, it is also possible to estimate an approximate value for the toner coverage from the output of the sensor which detects the original area.

In a digital image forming apparatus, if it has an image memory having a capacity corresponding to two or more surfaces of originals, it is possible to carry out all the processes from the estimation of the toner coverage to the image formation by performing regular scanning of the originals once in the sequence of the originals set.

Also, the present invention is also applicable to a printer which forms an image by an electrophotographic system with a digital image signal to be output from a host computer as an input signal as a matter of course.

As described above, according to the present invention, when images are formed on both surfaces of a recording medium, an image with less toner consumption is discriminated from an image with more toner consumption from the image signals obtained by scanning the images of the original before the image formation, the image with less toner consumption is first formed on the first surface of the recording medium, and the image with more toner consumption is formed on the second surface of the recording medium afterward. In the image formation on the first surface of the recording medium with less toner consumption, toner is less likely to adhere (offset) to the fixing roller in the fixing device, and therefore, the fixing roller is not coated with anti-offset liquid. In case of the image formation on the second surface of the recording medium with more toner consumption alone, it is controlled such that the fixing roller is coated with anti-offset liquid.

Thus, even if the fixing roller is sufficiently coated with anti-offset liquid correspondingly to the image recording on the second surface of the recording medium, since the recording medium is not conveyed within the apparatus again at this point of time, the anti-offset liquid adhered to the recording medium is conveyed together with the recording medium inside the apparatus to prevent trouble such as defective conveying of the recording medium resulting from the anti-offset liquid or defective image due to lowered sensitivity of the photosensitive member.

In addition, since the image with less toner consumption is first formed on the first surface of the recording medium, curled recording medium due to the shrinkage of the toner melt-adhered also becomes less, and it is not likely to cause defective conveying within the conveying paths for sheet re-feeding, or defective attraction to the transfer drum. The present invention achieves remarkable effects.

It is further understood by those skilled in the art that the foregoing description is a preferred embodiment of the disclosed device and that various changes and modifications may be made in the invention without departing from the spirit and scope thereof.

What is claimed is:

1. An image forming apparatus, comprising:
    image forming means for forming images by means of toner on a first surface and a second surface of a recording medium, respectively, on the basis of an image signal;
    discrimination means for discriminating on the basis of the image signal which image consumes less toner amount for image formation among the images forming on the first surface and second surface of the recording medium, respectively; and
    control means for controlling said image forming means so as to execute the image formation operation giving priority to the image which has been discriminated by said discrimination means as an image of less toner mount consumption.

2. An image forming apparatus according to claim 1, wherein:
    said discrimination means regards a value obtained by integrating values of image signals per pixel as an estimated value for toner mount to be consumed for the image formation, and discriminates which image consumes less toner mount for image formation among the images forming on the first surface and second surface of the recording medium, respectively, on the basis of the estimated value.

3. An image forming apparatus according to claim 1, wherein:
    said discrimination means discriminates whether an image to be formed is a chromatic image or an achromatic image on the basis of the image signal, and judges that the achromatic image consumes less toner amount than the chromatic image when one image is a chromatic image and another image is an achromatic image.

4. An image forming apparatus, comprising:
    image forming means for forming images by means of toner on a first surface and a second surface of a recording medium, respectively, on the basis of an image signal;
    fixing means for heating and bonding compressively a toner image formed on the recording medium;
    anti-offset liquid feeding means for feeding anti-offset liquid to said fixing means;
    discrimination means for discriminating, on the basis of the image signal, which image consumes less toner amount for image formation among images forming on the first surface and second surface of the recording medium, respectively; and
    feed control means for controlling said anti-offset liquid feeding means for stopping or reducing the feed of the anti-offset liquid to said fixing means when the image to be formed has been discriminated by said discrimination means as an image of less toner amount consumption.

5. An image forming apparatus according to claim 4, wherein:
    said discrimination means regards a value obtained by integrating values of image signals per pixel as an estimated value for toner amount to be consumed for the image formation, and discriminates which image consumes less toner amount for image formation among images forming on the first surface and second surface of the recording medium, respectively, on the basis of the estimated value.

6. An image forming apparatus according to claim 4, wherein:
    said discrimination means discriminates whether an image to be formed is a chromatic image or an achromatic image on the basis of the image signal, and judges that the achromatic image consumes less toner amount than the chromatic image when one image is a chromatic image and another image is an achromatic image.

7. An image forming apparatus, comprising:
    image forming means for forming images by means of toner on a first surface and a second surface of a recording medium, respectively, on the basis of an image signal;
    fixing means for heating and bonding compressively a toner image formed on the recording medium;
    anti-offset liquid feeding means for feeding anti-offset liquid to said fixing means;
    discrimination means for discriminating, on the basis of the image signal, which image consumes less toner amount for image formation among images forming on the first surface and second surface of the recording medium, respectively;
    first control means for controlling said image forming means so as to execute the image formation operation giving priority to the image which has been discriminated by said discrimination means as an image of less toner amount consumption; and
    second control means for controlling said anti-offset feeding means for stopping or reducing the feed of anti-offset to said fixing means when the image to be formed has been discriminated by said discrimination means as an image of less toner amount consumption.

8. An image forming apparatus according to claim 7, wherein:
    said discrimination means regards a value obtained by integrating values of image signals per pixel as an estimated value for toner amount to be consumed for the image formation, and discriminates which image consumes less toner amount for image formation among images forming on the first surface and second surface of the recording medium, respectively, on the basis of the estimated value.

9. An image forming apparatus according to claim 7, wherein:

said discrimination means discriminates whether an image to be formed is a chromatic image or an achromatic image on the basis of the image signal, and judges that the achromatic image consumes less toner amount than the chromatic image when one image is a chromatic image and another image is an achromatic image.

* * * * *